US011138689B2

(12) United States Patent
Chang et al.

(10) Patent No.: US 11,138,689 B2
(45) Date of Patent: Oct. 5, 2021

(54) METHOD AND SYSTEM FOR NON-LINEARLY STRETCHING A CROPPED IMAGE

(71) Applicant: Quanta Computer Inc., Taoyuan (TW)

(72) Inventors: Chun-Chieh Chang, Taoyuan (TW); Chung-Run Liao, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/199,569

(22) Filed: Nov. 26, 2018

(65) Prior Publication Data
US 2019/0370935 A1    Dec. 5, 2019

(30) Foreign Application Priority Data
May 31, 2018   (TW) .............. 107118708 A

(51) Int. Cl.
*G06K 9/00*          (2006.01)
*G06T 3/40*          (2006.01)
(Continued)

(52) U.S. Cl.
CPC .......... *G06T 3/4023* (2013.01); *G06T 3/0018* (2013.01); *G06F 3/04883* (2013.01)

(58) Field of Classification Search
CPC ... G06T 3/4023; G06T 3/0018; G06T 3/0093; G06T 3/0062; G06T 3/4038; G06T 3/00; G06T 3/0006; G06T 7/80; G06T 7/30; G06T 7/97; G06T 11/00; G06T 11/60; G06T 2200/32; G06T 2207/20221; G06F 3/04883; G06F 3/04847; H04N 5/23238; H04N 5/3415; H04N 5/262; H04N 5/2624; H04N 5/2628; H04N 5/23216; H04N 5/265; H04N 9/3185; H04N 2013/0088; G01C 11/02; G03B 37/06; G03B 37/04; G03B 27/00; G03B 27/68; B60R 2300/303; G02B 13/06; G02B 27/0025; G06K 9/2054; G06K 9/32

See application file for complete search history.

(56) References Cited

U.S. PATENT DOCUMENTS 6,671,400 B1 *  12/2003  Ekpar .................. G06T 3/4038
                                               382/157
8,368,773 B1 *   2/2013  Jin ..................... G06K 9/3275
                                               348/222.1
(Continued)

*Primary Examiner* — Jose L Couso
(74) *Attorney, Agent, or Firm* — McClure, Qualey & Rodack, LLP

(57) ABSTRACT

The present invention provides a method for non-linearly stretching a cropped image, including: obtaining an FOV difference table of a panoramic lens; calculating a polynomial of an approximated curve represented by the values of the FOV difference table; shooting a circular wide-angle image using the panoramic lens; cropping the circular wide-angle image to preserve the remaining circular wide-angle image under a specific viewing angle; under the specific viewing angle, resampling a plurality of points by the polynomial to obtain the corresponding spacing distance of the points; and while maintaining the ratio of the spacing distance between the plurality of points, stretching the remaining circular wide-angle image to the size of the original circular wide-angle image.

10 Claims, 14 Drawing Sheets

(51) Int. Cl.
*G06T 3/00* (2006.01)
*G06F 3/0488* (2013.01)

(56) References Cited

U.S. PATENT DOCUMENTS

| | | | |
|---|---|---|---|
| 9,609,197 B1* | 3/2017 | Stepanenko | H05K 999/99 |
| 10,692,175 B1* | 6/2020 | Stepanenko | H04N 5/217 |
| 2006/0023105 A1* | 2/2006 | Kostrzewski | G06T 3/0018 |
| | | | 348/335 |
| 2013/0124471 A1* | 5/2013 | Chen | H04N 5/23238 |
| | | | 707/624 |
| 2017/0236249 A1* | 8/2017 | Roulet | G06F 3/04847 |
| | | | 382/275 |
| 2017/0345136 A1* | 11/2017 | Van der Auwera | G06T 5/006 |
| 2019/0102868 A1* | 4/2019 | Beric | H04N 5/217 |
| 2020/0137317 A1* | 4/2020 | Abbas | H04N 7/181 |
| 2020/0193562 A1* | 6/2020 | Roulet | G06T 5/006 |

\* cited by examiner

METHOD AND SYSTEM FOR NON-LINEARLY STRETCHING A CROPPED IMAGE

CROSS REFERENCE TO RELATED APPLICATIONS

This application claims priority of Taiwan Patent Application No. 107118708, filed on May 31, 2018, the entirety of which is incorporated by reference herein.

BACKGROUND OF THE INVENTION

Field of the Invention

The present invention relates in general to a method and system for non-linearly stretching a cropped image, and in particular it relates to a method and system for reducing deformation of a cropped panoramic image.

Description of the Related Art

Recently, panoramic photography devices, or cameras, equipped with fisheye lenses have been used more and more widely. After using a fisheye lens to capture an ultra-wide-angle image such as a 180-degree angle of view, the user can view the resulting image on the display screen. Before entering a corrected image, a circular wide-angle image (or fisheye image) is displayed on the display screen. In response to the user's need to cut the image, image processing software for captured images provides the ability to crop a circular wide-angle image.

After cropping the circular wide-angle image, it is necessary to stretch the remaining circular wide-angle image to the size of the original circular wide-angle image, so that the panoramic image of the same viewing angle range (for example, 180 degrees) can be maintained. The traditional stretching method is to linearly stretch the remaining circular wide-angle image to the size of the original circular wide-angle image. However, since the distance of the respective angle of view in the circular wide-angle image is not equidistant, if linear stretching is performed, when the stretched circular wide-angle image is converted into the corrected image, it will be found that the proportional relationship between the center and the periphery of the image will deviate greatly from the original image: that is, image deformation.

To solve the above problem, the purpose of the invention is to provide a method and system for non-linearly stretching a cropped image, which is capable of reducing deformation of the cropped panoramic image.

BRIEF SUMMARY OF THE INVENTION

A detailed description is given in the following embodiments with reference to the accompanying drawings.

According to an embodiment, the present invention provides a method for non-linearly stretching a cropped image, including: obtaining an FOV difference table of a panoramic lens; calculating a polynomial of an approximated curve represented by the values of the FOV difference table; shooting a circular wide-angle image using the panoramic lens; cropping the circular wide-angle image to preserve the remaining circular wide-angle image under a specific viewing angle; under the specific viewing angle, resampling a plurality of points by the polynomial to obtain the corresponding spacing distance of the points; and while maintaining the ratio of the spacing distance between the plurality of points, stretching the remaining circular wide-angle image to the size of the original circular wide-angle image.

According to another embodiment, the invention also provides as system for non-linearly stretching a cropped image, including a panoramic lens, a display screen, a memory, and a processor. The panoramic lens shoots a circular wide-angle image. The display screen provides input settings for cropping the circular wide-angle image. The memory stores an FOV difference table for the panoramic lens. The processor reads the FOV difference table in the memory, calculates the polynomial of an approximated curve drawn by the FOV difference table, and stores it in the memory. When a cropping instruction is input to an input interface, and the cropping instruction indicates that only a portion of the circular wide-angle image within a specific viewing angle range is to be retained, the processor performs the following process: in the specific viewing angle range, the processor resamples a plurality of points by the polynomial to obtain the corresponding spacing distance of the points. The processor stretches the remaining circular wide-angle image to the size of the original circular wide-angle image while maintaining the ratio of the spacing distance between the plurality of points. The processor outputs the stretched circular wide-angle image to the display screen.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
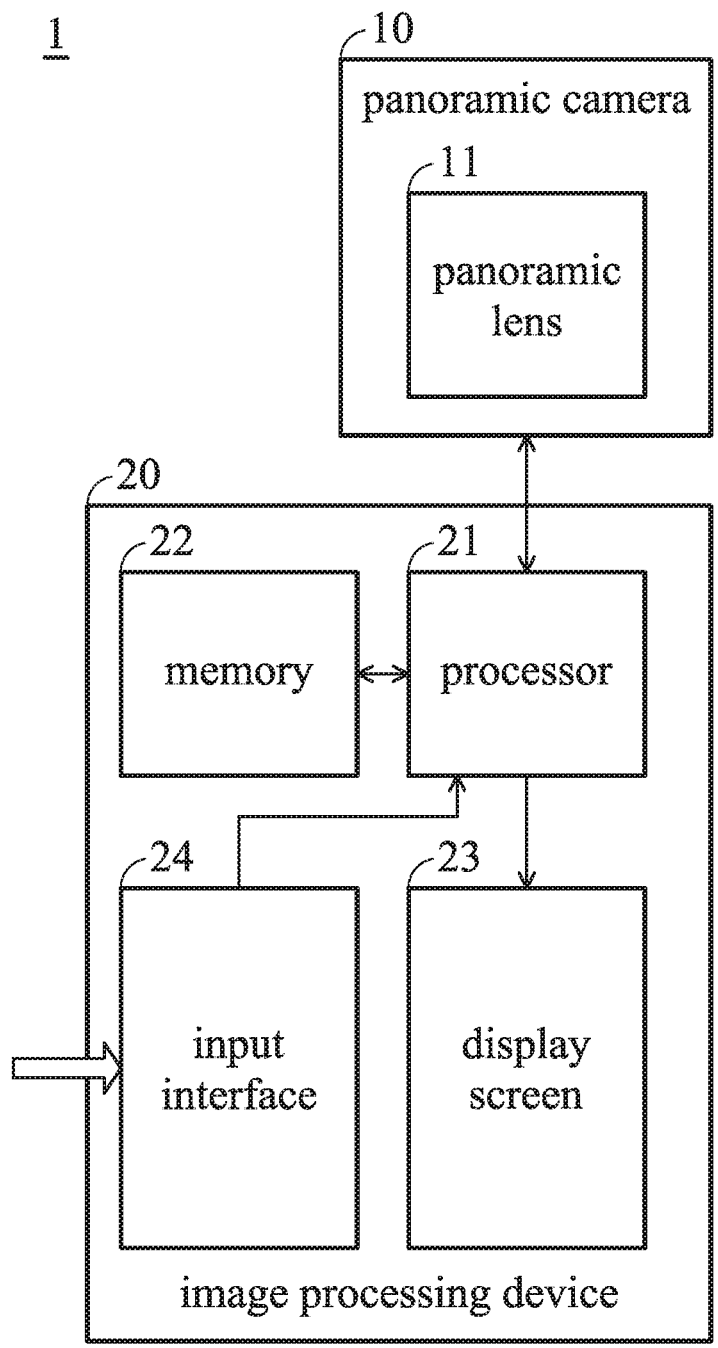
FIG. 1 is a schematic block diagram showing a system for non-linearly stretching a cropped image according to the present invention.

The following disclosure provides many different embodiments, or examples, for implementing different features of the present disclosure. Specific examples of components and arrangements are described below to simplify the present disclosure, and do not limit the invention.

In addition, the present disclosure may repeat reference numerals and/or letters in the various examples. This repetition is for the purpose of simplicity and clarity and does not in itself dictate a relationship between the various embodiments and/or configurations discussed.

Furthermore, the shape, size, and thickness in the drawings may not be drawn to scale or simplified for clarity of discussion; rather, these drawings are merely intended for illustration.

FIG. 1 is a schematic block diagram showing a system for non-linearly stretching a cropped image according to the present invention. The system 1 for non-linearly stretching and cropping images of the present invention includes a panoramic camera 10 and an image processing device 20. The panoramic camera 10 includes at least one panoramic lens (fisheye lens) 11 for taking a circular wide-angle image (fisheye image). The panoramic camera 10 can be a 360-degree panoramic camera of various styles on the market introduced by various manufacturers. The image processing device 20 includes a processor 21, a memory 22, a display screen 23, and an input interface 24. The image processing device 20 and the panoramic camera 10 can be connected by a wired (for example, USB) or wireless (Wi-Fi) communication, thereby transmitting control signals and capturing images. The image processing device 20 may be an electronic computing device having a computing function such as a notebook computer, a tablet computer, or a smart phone.

Figure 2:
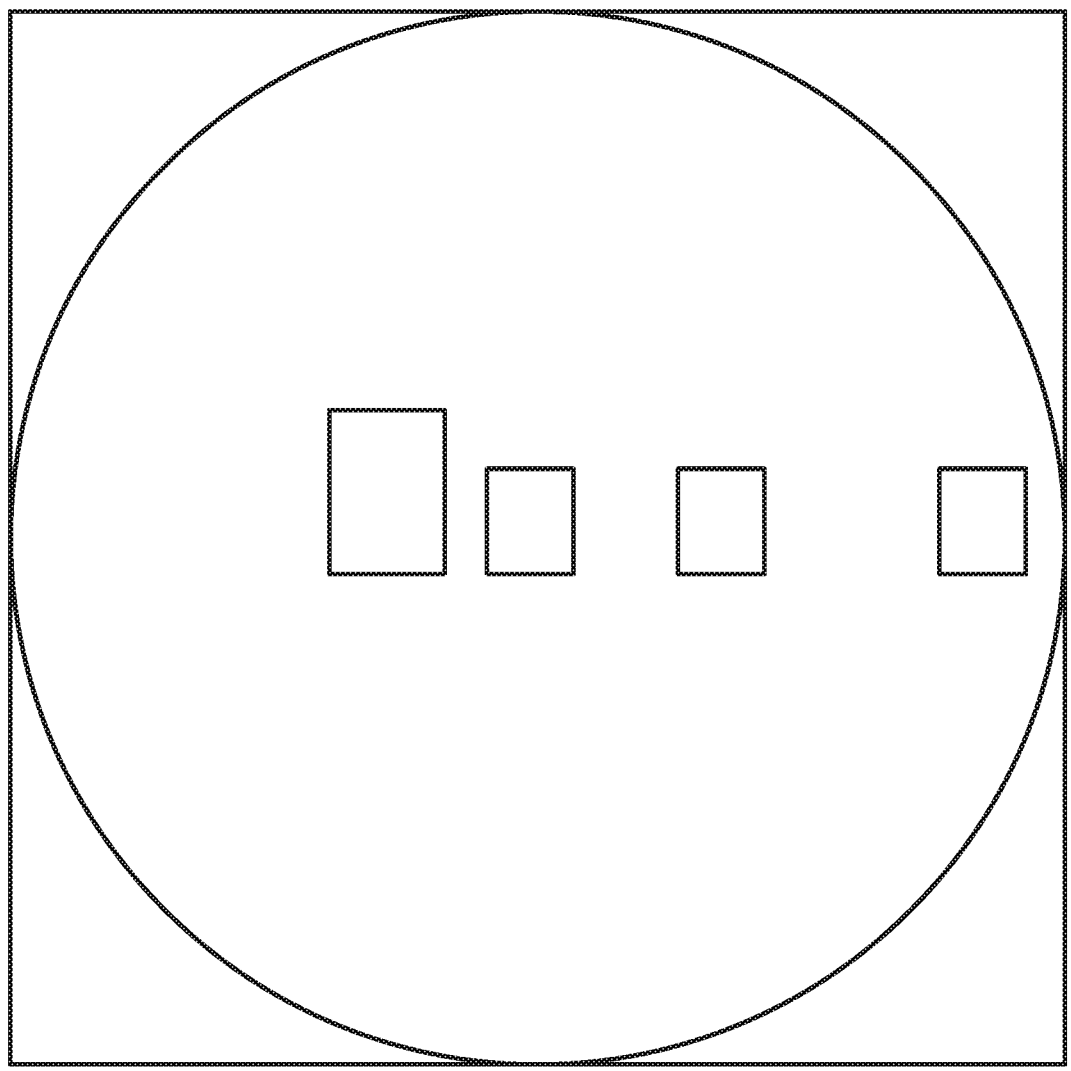
FIG. 2 is a view showing a circular wide-angle image taken by a panoramic lens according to an embodiment of the present invention.

When a panoramic image is captured by the panoramic lens 11 of the panoramic camera 10, the image processing device 20 displays the captured image on the display screen 23 as a circular wide-angle image. The circular wide-angle image displayed on the display screen 23 is as shown in FIG. 2. Here, in order to explain the relationship of the respective viewing angle in each of the circular wide-angle images, a triangular mesh is used for presentation. Each of the different styles of the panoramic lens 11 is provided by the manufacturer with an optical viewing angle versus spacing distance table (or FOV difference table) corresponding to the panoramic lens 11. When the panoramic camera 10 and the image processing device 20 are connected, the processor 21 of the image processing device 20 can read the FOV difference table pre-stored by the camera manufacturer from the panoramic camera 10, and store it in the memory 22 of the image processing device 20.

The so-called FOV difference table is a table of the spacing distance of each viewing angle in a circular wide-angle image. This spacing distance can use the value in distance on an image sensing array. In the example of a certain panoramic lens 11, the spacing distance is 0.024 when the viewing angle is 1 degree, which means that the distance between a 1-degree viewing angle and a 0-degree viewing angle on the image sensing array is 0.024 mm; and the spacing distance is 0.023 when the viewing angle is 90 degrees, which means that the distance between a 90-degree viewing angle and an 89-degree viewing angle on the image sensing array is 0.023 mm. The unit can be eliminated to focus only on the relationship between the spacing distances, for example, 0.025 mm can be normalized to 1, so that all spacing distances become a ratio with respect to 1. A curve of optical viewing angle versus spacing distance and a mesh corresponding to a circular wide-angle field of view can be generated from this normalized FOV difference table.

Figure 3:
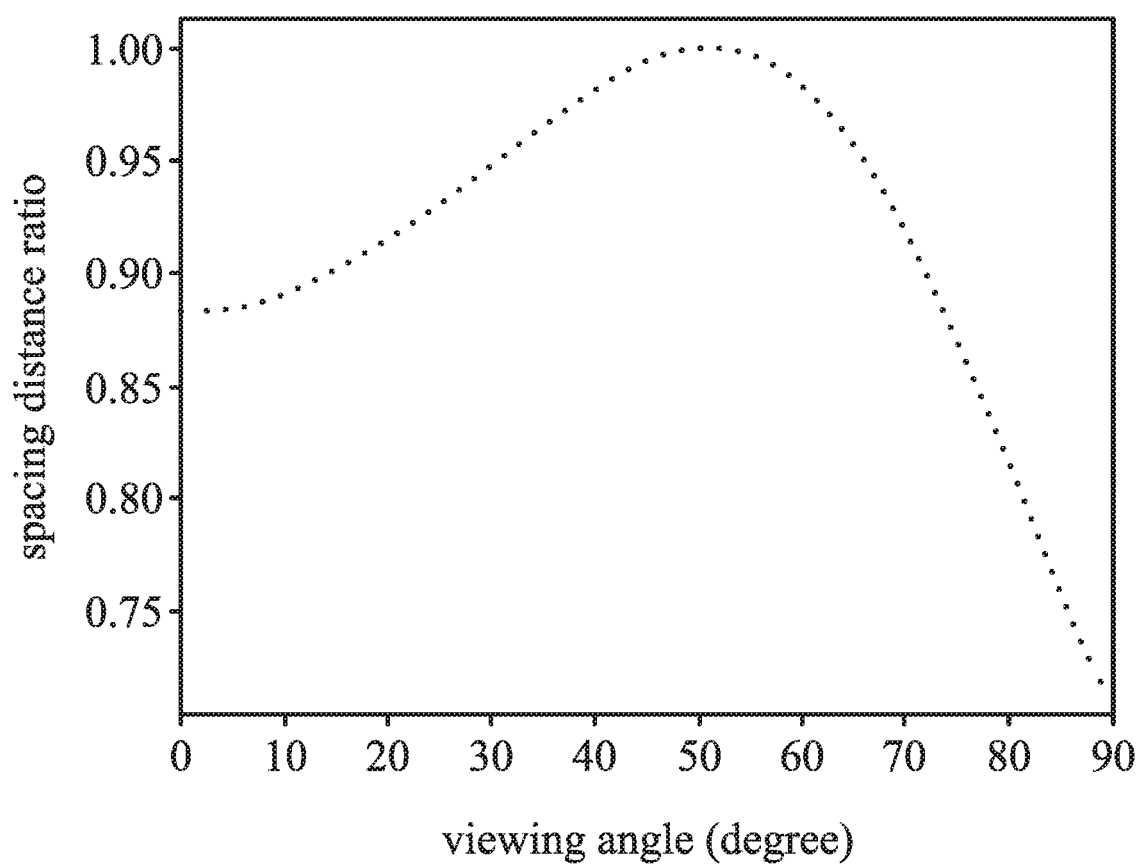
FIG. 3 is a diagram showing a curve of optical viewing angle versus spacing distance in accordance with an embodiment of the present invention.

FIG. 3 is a diagram showing a curve of optical viewing angle versus spacing distance in accordance with an embodiment of the present invention. After normalizing the spacing distance of the FOV difference table, the viewing angle is used as the horizontal axis and the spacing distance ratio is used as the vertical axis, and the curve of the optical viewing angle versus spacing distance can be drawn as shown in FIG. 3. In this diagram, it can be seen that the spacing distance ratio gradually increases as it leaves the center of the image (a 0-degree viewing angle), reaches the maximum value at a viewing angle of about 50 degrees, and then drops rapidly to reach the minimum value at about a 90-degree viewing angle.

Figure 4:
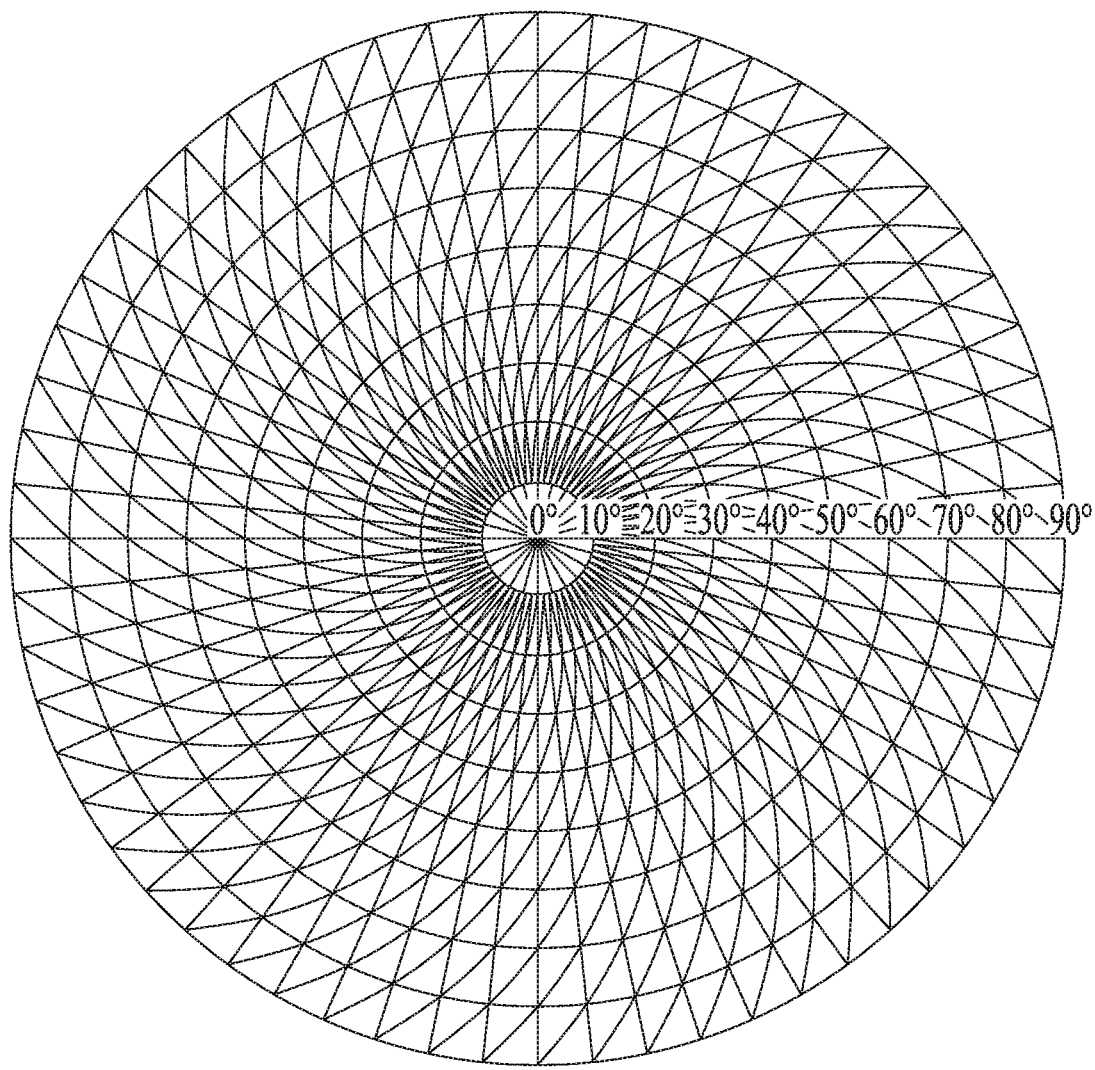
FIG. 4 is a diagram showing a mesh corresponding to an original circular wide-angle image according to an embodiment of the present invention.
Figure 5:
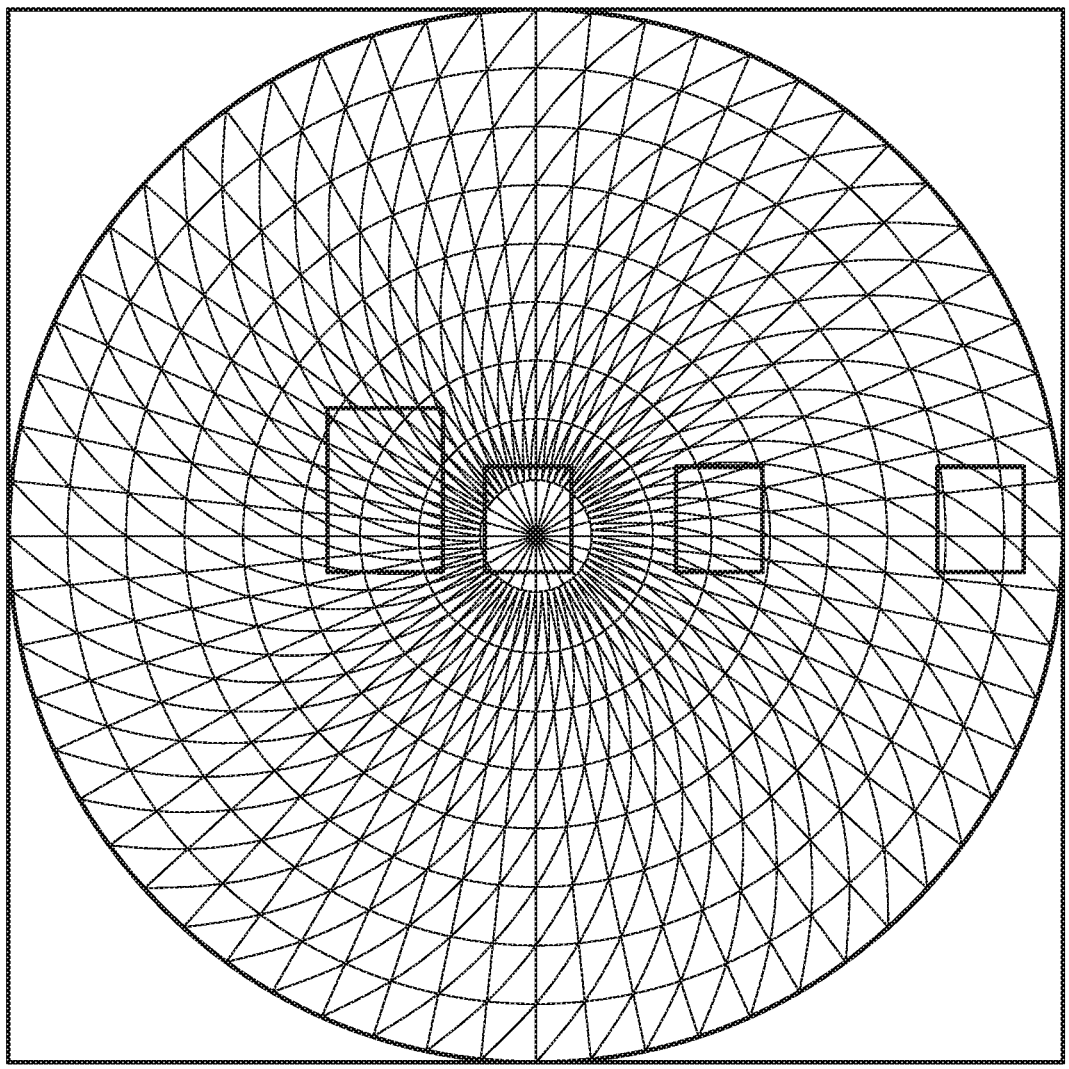
FIG. 5 is a diagram showing the circular wide-angle image of FIG. 2 covered by the mesh of FIG. 4.

Similarly, a mesh of the circular wide-angle images taken by the panoramic lens 11 can be generated using the normalized FOV difference table. As shown in FIG. 4, in the embodiment, the generated mesh is a triangular mesh, and the concentric circles outward from the center of the mesh respectively represent viewing angles of 10 degrees, 20 degrees, 30 degrees, 40 degrees, 50 degrees, 60 degrees, 70 degrees, 80 degrees, and 90 degrees. The distance between each concentric circle is different, which indicates that the above-mentioned spacing distance changes with the viewing angle. When the mesh is out onto the circular wide-angle image captured by the panoramic lens 11 in FIG. 2, as shown in FIG. 5, the user can observe the corresponding viewing angles of the respective positions on the circular wide-angle image from the display screen 23.

Figure 6:
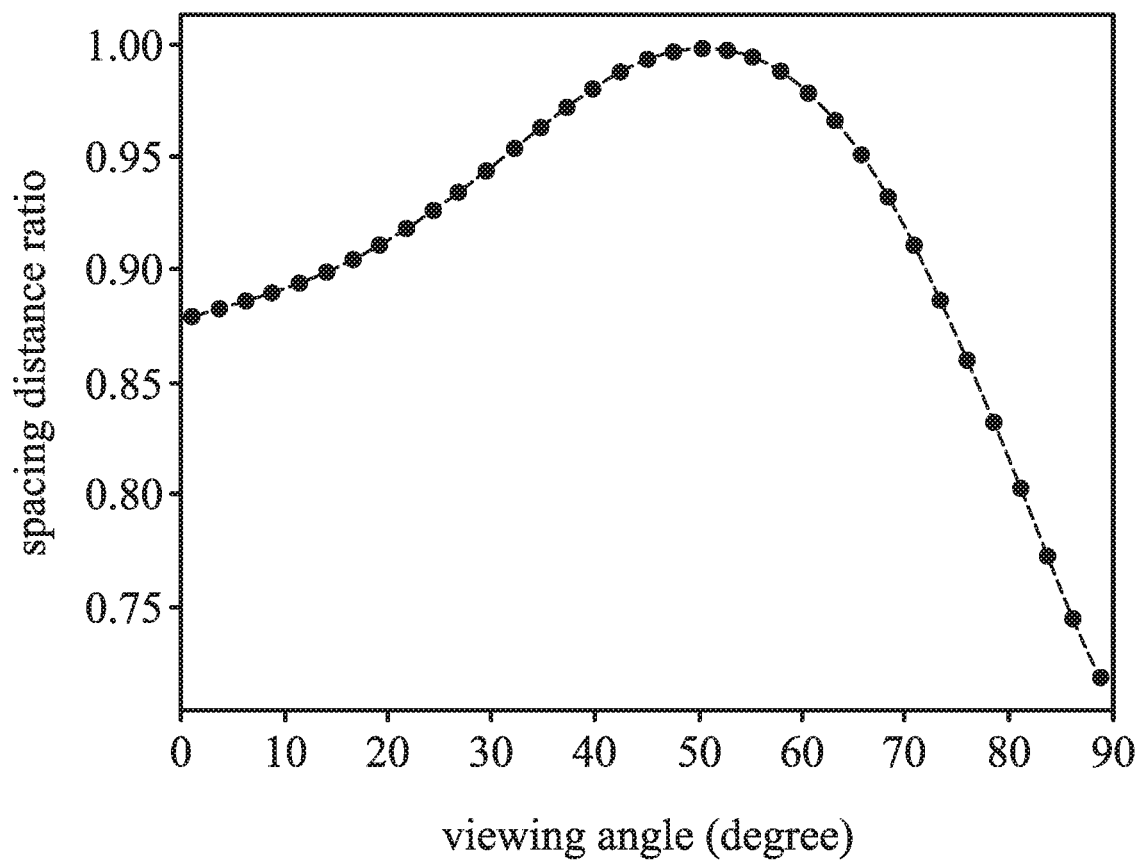
FIG. 6 is a diagram showing an approximation curve of optical viewing angle versus spacing distance according to an embodiment of the present invention.

FIG. 3 is diagram showing a curve depicted from all the data in FOV difference table. However, the processor 21 of the present invention can extract only the data of every n degree in the FOV difference table to draw a curve. The value of n can be between 1 and 10. In an embodiment, the spacing distance ratios of every 5 degree viewing angles are taken from the FOV difference table, and the polynomial closest to the curve is calculated from those data. This polynomial can be, for example, a fifth degree polynomial ($y=ax^5+bx^4+cx^3+dx^2+ex+f$). The curve of this polynomial, as shown in FIG. 6, will approximate the curve in FIG. 3. In FIG. 6, the line of dots indicates the approximated curve of the polynomial calculated from the data of the every 5 degree viewing angle. After the processor 21 calculates the polynomial of the approximated curve, the polynomial is stored in the memory 22.

Figure 7:
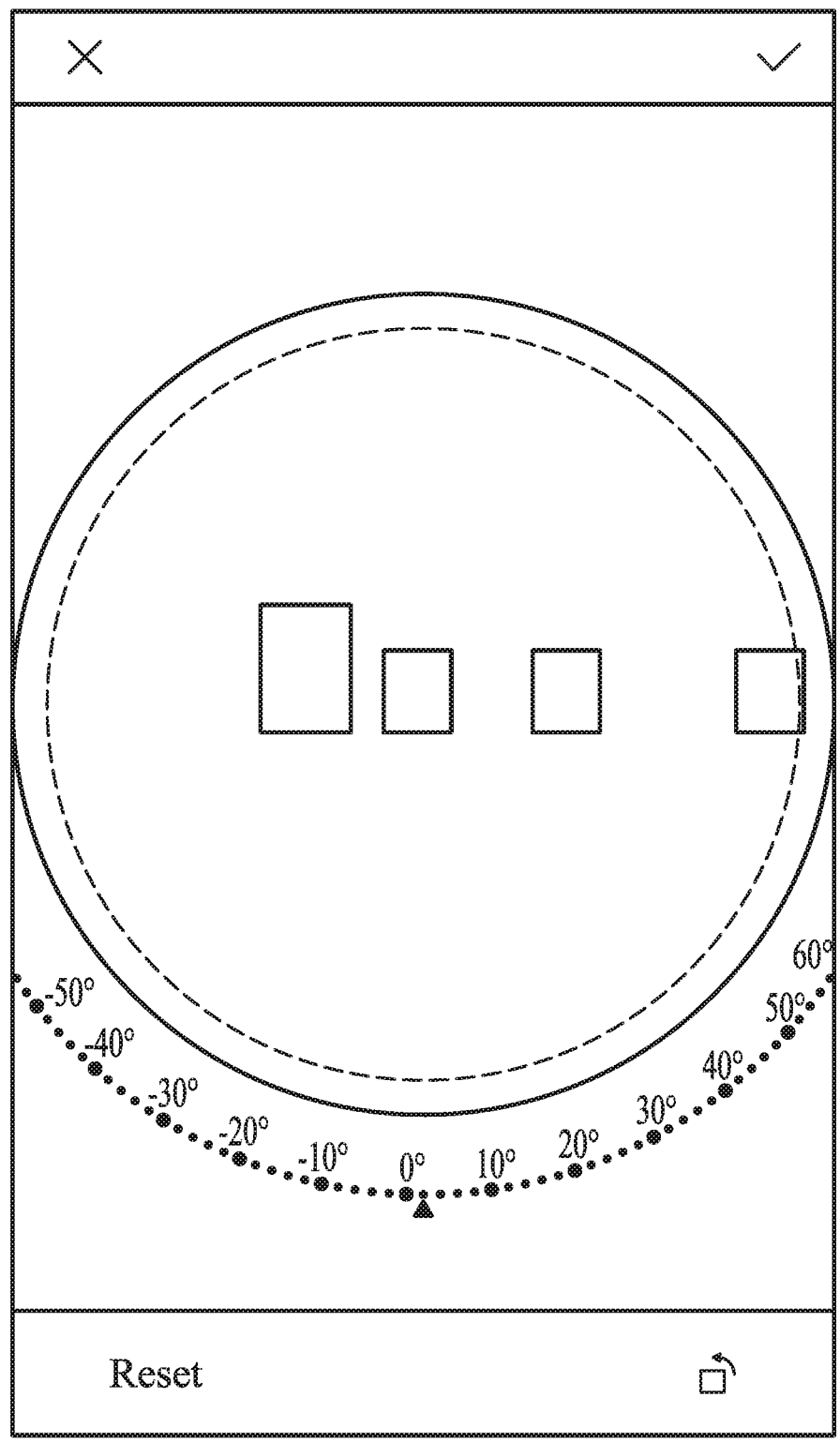
FIG. 7 is a schematic diagram showing the setting of cropping a circular wide-angle image according to an embodiment of the present invention.

Next, when the user views the circular wide-angle image displayed by the display screen 23 and wants to crop a portion of the periphery, the input interface 24 of the image processing device 20 provides a user to input setting of cropping. The user can input a ratio to be cropped through the input interface 24. The ratio that can be cropped is limited to a specific range by the image processing apparatus 20. As an example, the display screen 23 can display the range that the user wants to crop on a circular wide-angle image as shown in FIG. 7. The dotted circle indicates a cropping line, and the user can adjust the cropping line inward or outward to select the cropping range. In an example, the input interface 24 can be a touch sensor, and the touch sensor can be, for example, a touch array disposed in the display screen 23. The image processing device 20 provides a graphical interface that allows the user to directly pull the dotted circle on the on the screen to adjust the range (ratio) to be cropped.

Figure 8:
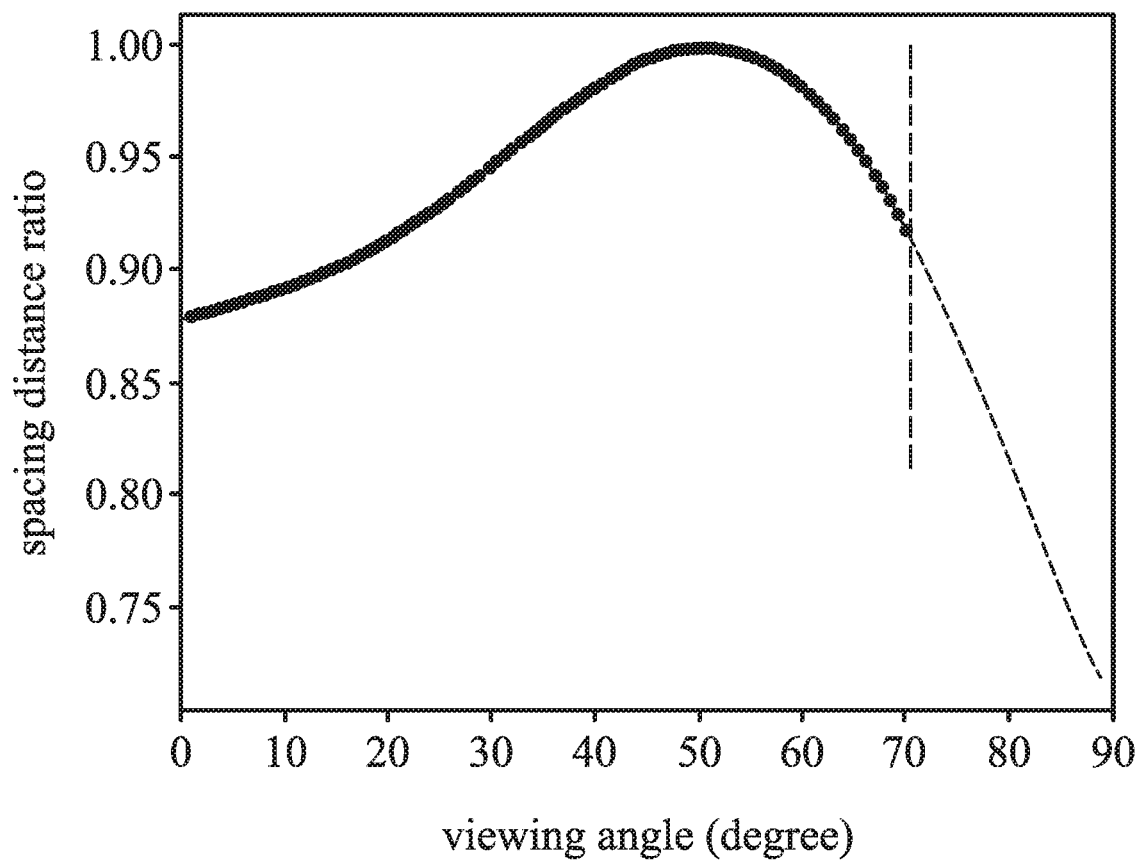
FIG. 8 is a schematic diagram showing the re-sampling of the approximation curve of optical viewing angle versus spacing distance within a certain range.

After the setting of the cropping ratio value is completed, the processor 21 determines the range of the viewing angle of the circular wide-angle image remaining after the cropping, and use the previously calculated polynomial to resample a plurality of points within the range. FIG. 8 is a schematic diagram showing the re-sampling of the approximation curve of optical viewing angle versus spacing distance within a certain range. When the user sets the range of the cropping, the processor 21 calculates a corresponding viewing angle based on the cropped position of the cropping. Taking FIG. 8 as an example, the cropped position is, for example, at the position of 70-degree viewing angle of the original circular wide-angle image. The processor 21 resamples a plurality of points (for example, 90 points) by the polynomial within the remaining viewing angle range of 0 degrees to 70 degrees, and calculates the spacing distance ratio corresponding to each new sampled point.

Figure 9:
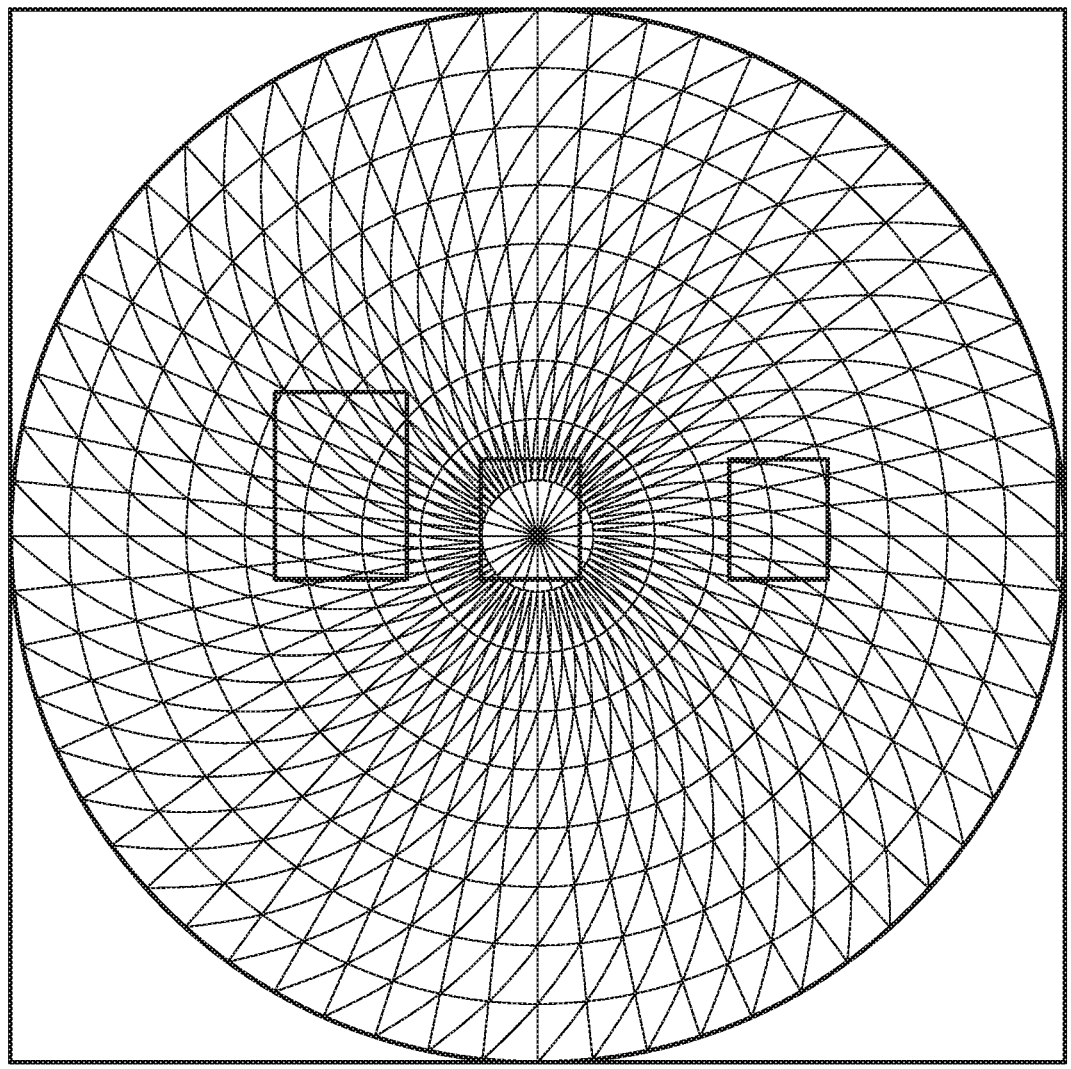
FIG. 9 is a schematic diagram showing a cropped circular wide-angle image covered by an optimized mesh according to an embodiment of the present invention.
Figure 10:
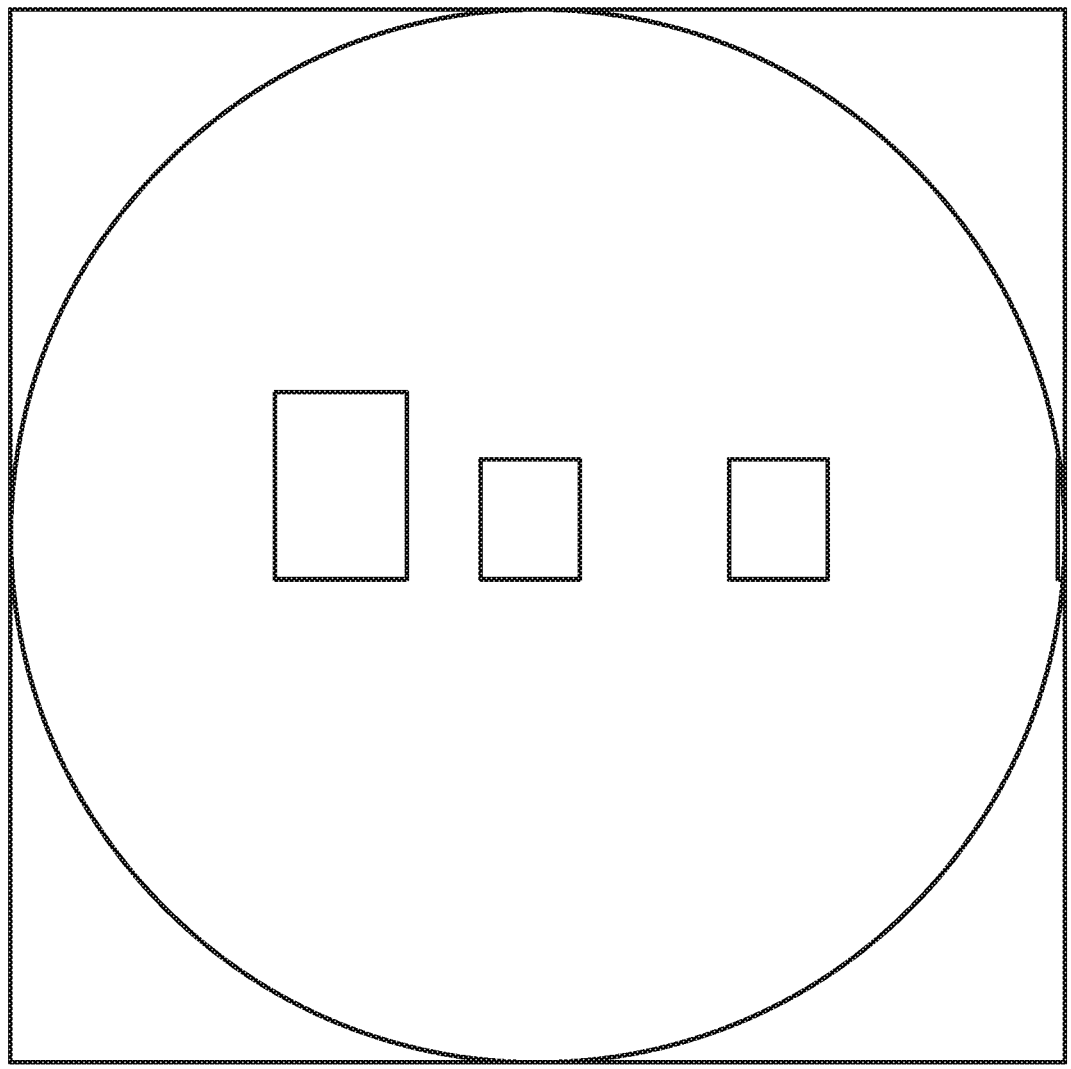
FIG. 10 is a diagram showing a non-linearly stretched circular wide-angle image according to an embodiment of the present invention.

According to the re-sampling result, the spacing distance ratio of, for example, 90 sampled points is maintained, and the remaining circular wide-angle image is stretched to the same size as the original circular wide-angle image, and the cropping operation is completed. The action of maintaining the spacing distance ratio of the plurality of sampled points and amplifying, from a graphical point of view, is to generate a new mesh based on the data of the new sampled points (in order to distinguish the name from the old mesh, here is called optimization mesh). Then, as shown in FIG. 9, the cropped circular wide-angle image covered by the optimized mesh is stretched to the same size of the original circular wide-angle image while the distance ratio of each grid of the optimized mesh is maintained. After the stretching is completed, the mesh is removed. As shown in FIG. 10, the display screen 23 shows the result of non-linearly stretching the cropped circular wide-angle image.

Figure 11:
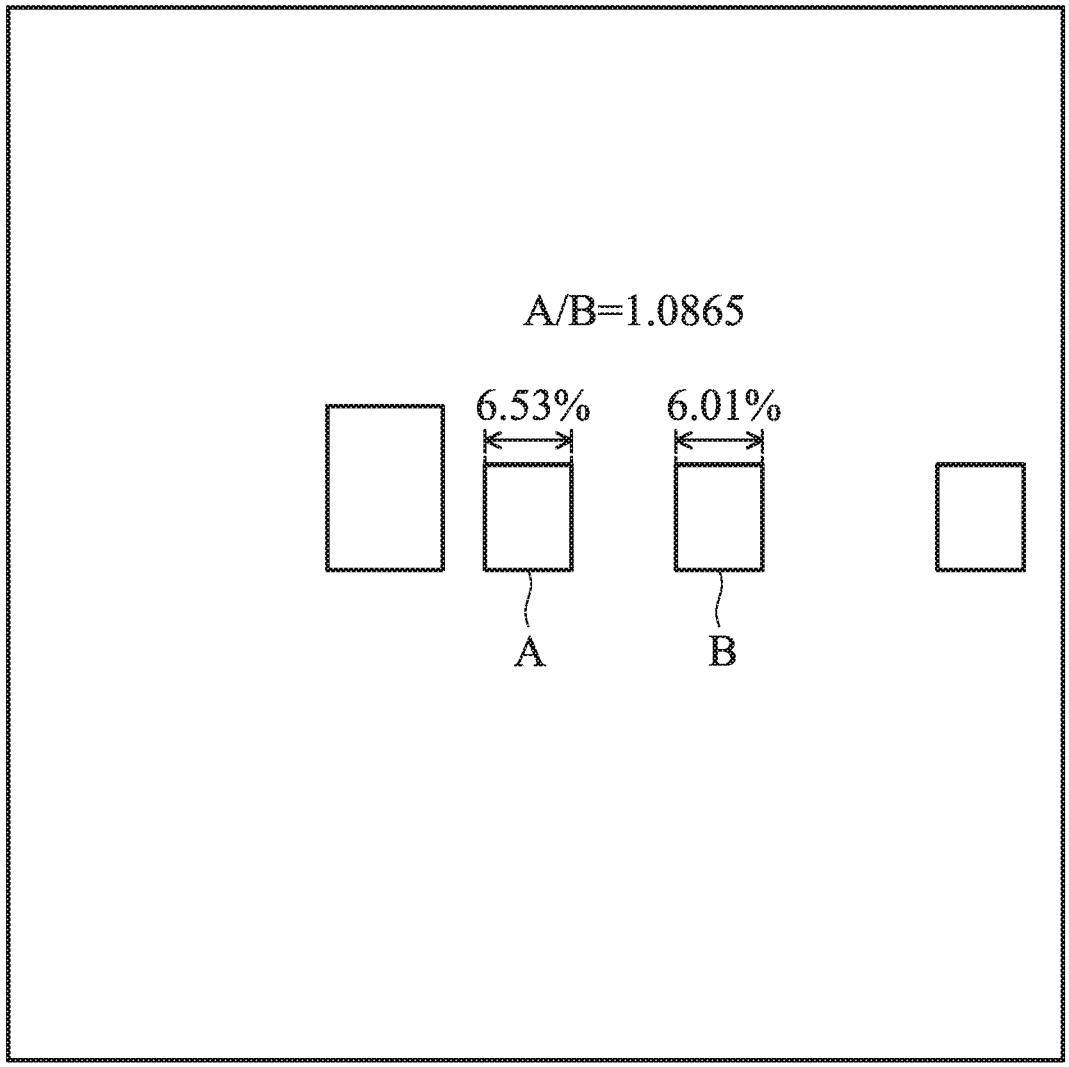
FIG. 11 shows a corrected image of the original circular wide-angle image of FIG. 2.

Next, the effect of the method of non-linearly stretching the cropped image using the present invention is examined. FIG. 11 shows a corrected image of the original circular wide-angle image of FIG. 2. As shown in FIG. 11, after correcting the original circular wide-angle image, the ratios of the center area and the edge area to the entire corrected image are calculated separately. Taking a block A located at the center of the image and a block B located at the right side of the image as an example, the width of the block A occupies 6.53% of the total image width, and the width of the block B occupies 6.01% of the total image width. The relative ratio of the block A to the block B is 1.0865.

Figure 12:
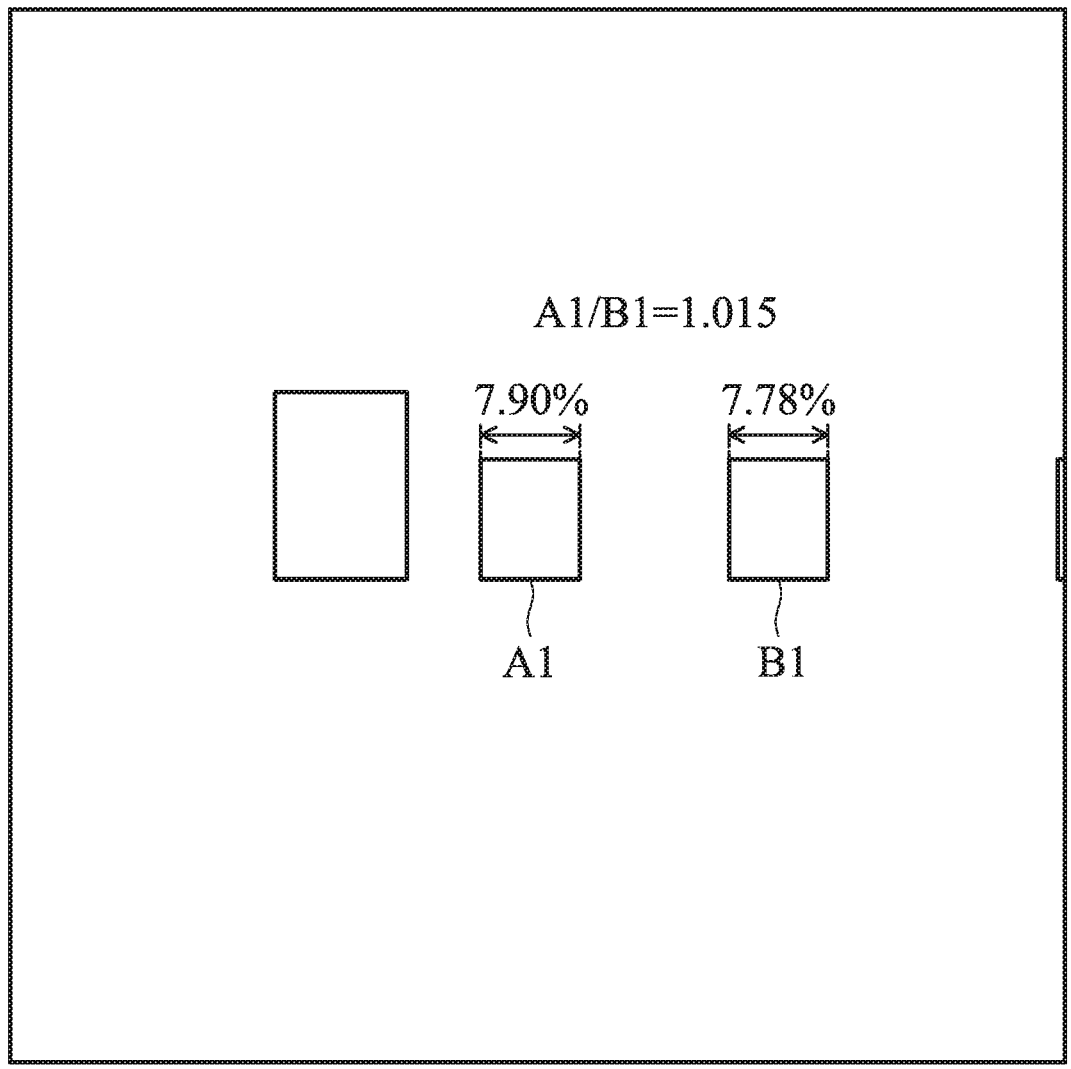
FIG. 12 shows a corrected image of the cropped circular wide-angle image which is linearly stretched.

Next, see the ratios of the center area and the edge area to an entire corrected image of a cropped circular wide-angle image which has been linearly stretched. FIG. 12 shows a corrected image of the cropped circular wide-angle image which is linearly stretched. As shown in FIG. 12, the linearly stretched circular wide-angle image is corrected. The block A in the original corrected image becomes a block A1, and the block B becomes a block B1. The ratios of the two blocks to the entire corrected image are calculated. The width of the block A1 occupies 7.90% of the total image width, and the width of the block B1 occupies 7.78% of the total image width. The relative ratio of the block A1 to the block B1 is 1.015.

Figure 13:
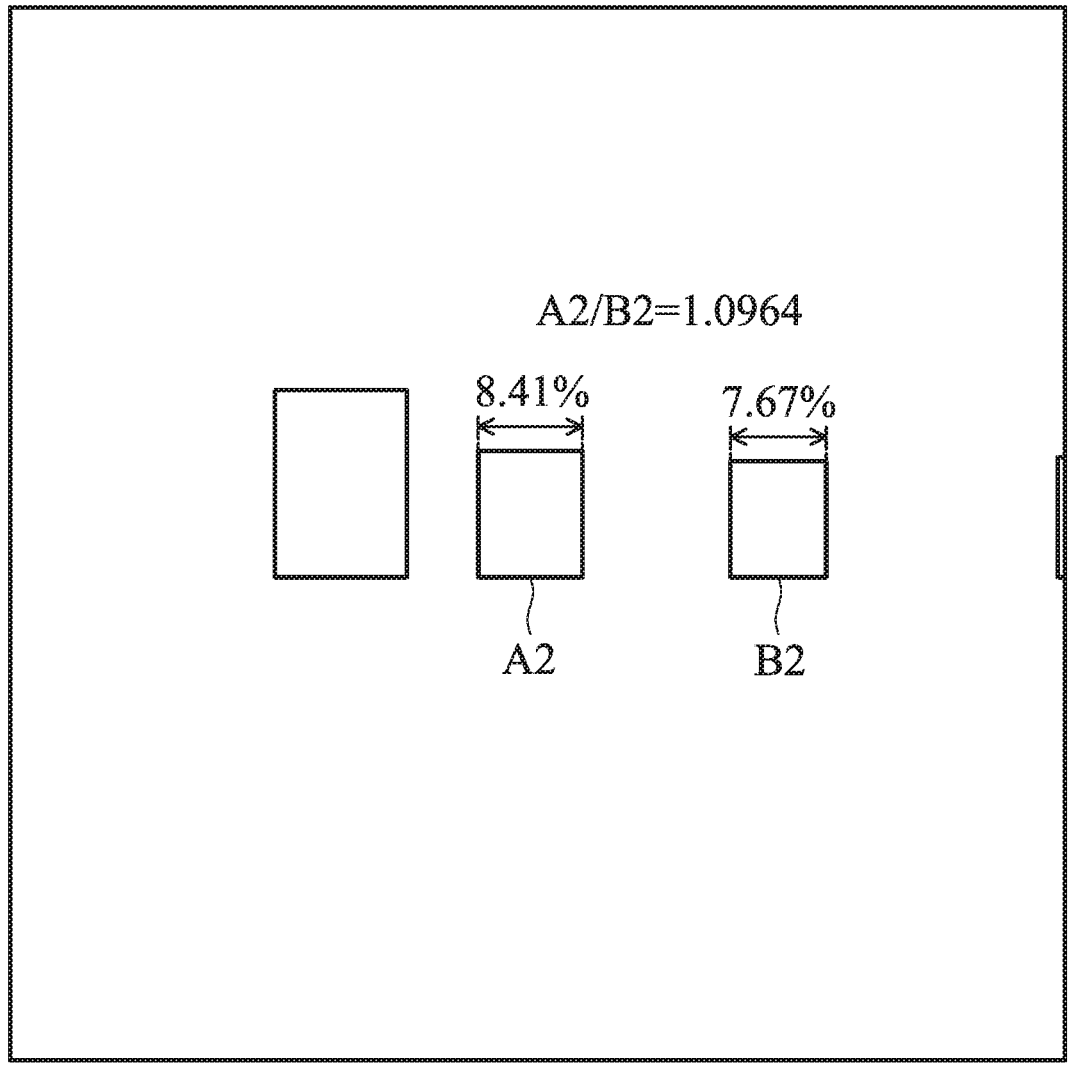
FIG. 13 shows a corrected image of the cropped circular wide-angle image which is non-linearly stretched according to the present invention.

Finally, see the ratios of the center area and the edge area to an entire corrected image of a cropped circular wide-angle image which has been non-linearly stretched according to the present invention. FIG. 13 shows a corrected image of the cropped circular wide-angle image which is non-linearly stretched according to the present invention. As shown in FIG. 13, the non-linearly stretched circular wide-angle image is corrected. The block A in the original corrected image becomes a block A2, and the block B becomes a block B2. The ratios of the two blocks to the entire corrected image are calculated. The width of the block A2 occupies 8.41% of the total image width, and the width of the block B2 occupies 7.67% of the total image width. The relative ratio of the block A2 to the block B2 is 1.0964.

In summary, a variation of the center area and the edge area of the image may be observed in numerical values. When a linear stretching method is used to enlarge the cropped image, a large degree of deformation (|1.0865−1.015|=0.0715) is obtained. When the nonlinear stretching method of the invention is used to enlarge the cropped image, a small degree of deformation (|1.0865−1.0964|=0.0099) is obtained. Therefore, it is apparent that the system for non-linearly stretching the cropped image according to the present invention can ensure that the cropped circular wide-angle image (panoramic image) has less distortion.

Figure 14:
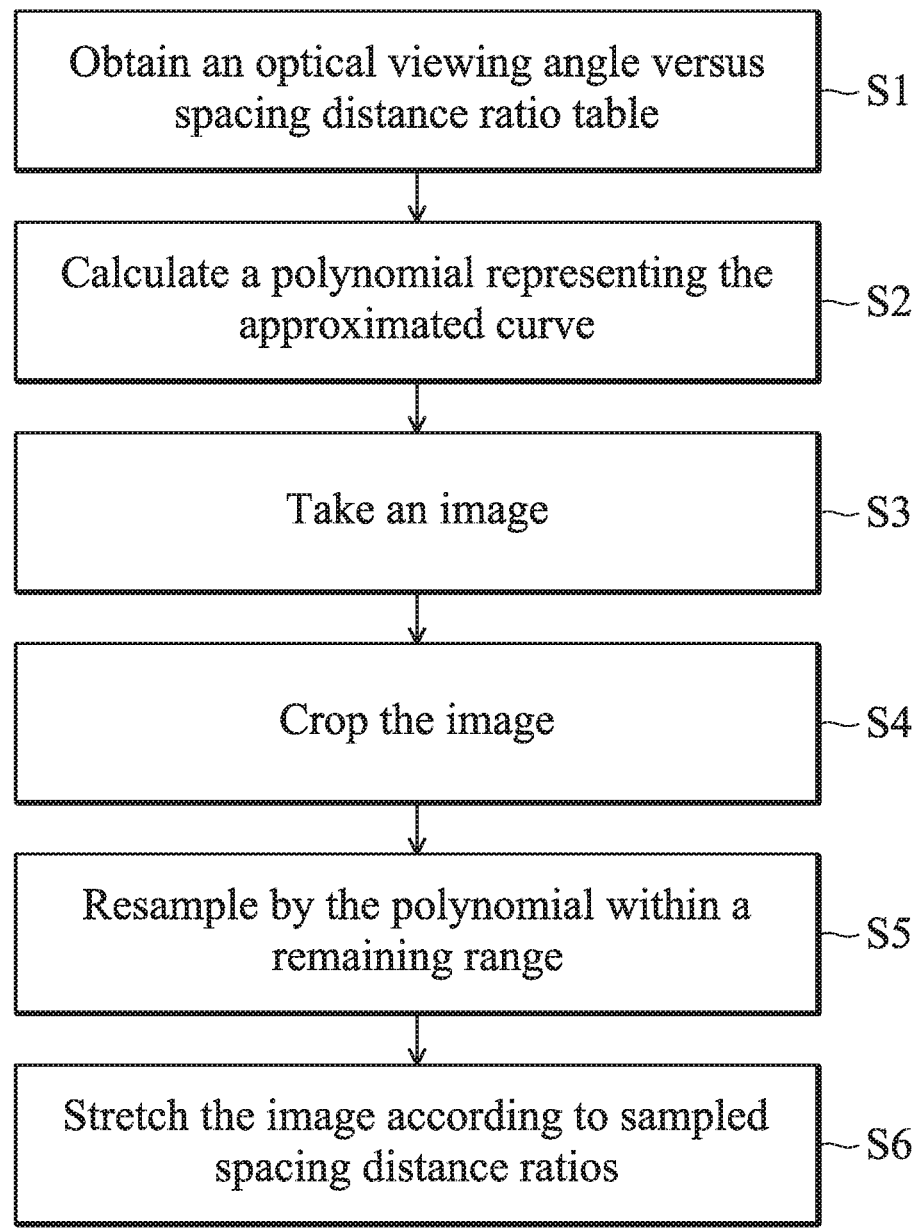
FIG. 14 is a flow chart showing the steps of the method of non-linearly stretching a cropped image according to the present invention.

FIG. 14 is a flow chart showing the steps of the method of non-linearly stretching a cropped image according to the present invention. In step S1, the FOV difference table of the panoramic lens (fisheye lens) to be used is obtained. Next, in step S2, the data of every n viewing angle in the FOV difference table is taken out, and a polynomial representing an approximated curve drawn by the data is calculated. The value of n is, for example, between 1 and 10. In step S3, a circular wide-angle image is taken using the panoramic lens. In step S4, the user performs a setting of cropping the circular wide-angle image, and the setting can provide the user to input a ratio to be cropped through, for example, a graphic interface. After cropping, only the remaining circular wide-angle images within a certain range of viewing angles are retained. In step S5, a plurality of points are resampled using the polynomial calculated in step S2 within a specific range of viewing angles, each point having a respective spacing distance. In step S6, the spacing distance ratio of each sampled point is maintained, and the remaining circular wide-angle image is stretched to the size of the original circular wide-angle image. From another point of view, the data sampled in step S5 can produce an optimized mesh, and in step S6, the distance ratio of each grid of the optimized mesh is maintained and the remaining circular wide-angle image is stretched to the size of the original circular wide-angle image.

According to the above embodiments of the present invention, the cropped circular wide-angle image can be non-linearly stretched, so that the change in the proportional relationship between the central area and the edge area of the panoramic image corrected from the circular wide-angle image is reduced, thereby reducing the degree of deformation of the panoramic image.

The features disclosed above can be combined, modified, substituted or diverted with one or more of the disclosed embodiments in any suitable manner and are not limited to the specific embodiments.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for non-linearly stretching a cropped image, comprising
obtaining an field-of-view (FOV) difference table of a panoramic lens;
calculating a polynomial of an approximated curve represented by a plurality of values of the FOV difference table;
shooting a circular wide-angle image using the panoramic lens;
cropping the circular wide-angle image to preserve a remaining circular wide-angle image under a specific viewing angle;
under the specific viewing angle, resampling a plurality of points by the polynomial to obtain a plurality of corresponding spacing distances of the points; and
while maintaining a ratio of the spacing distances between the plurality of points, stretching the remaining circular wide-angle image to an original size of the circular wide-angle image.

2. The method for non-linearly stretching a cropped image as claimed in claim 1, wherein the polynomial is obtained from the approximated curve of every n degree viewing angle versus its corresponding spacing distances, where $1 \leq n \leq 10$.

3. The method for non-linearly stretching a cropped image as claimed in claim 1, wherein the plurality of points resampled from the polynomial and the corresponding spacing distances produce an optimized mesh, and the remaining circular wide-angle image is stretched while maintaining a distance ratio of each grid of the optimized mesh.

4. The method for non-linearly stretching a cropped image as claimed in claim 1, wherein the values are 1 to 90.

5. The method for non-linearly stretching a cropped image as claimed in claim 1, wherein the cropping of the circular wide-angle image is implemented by inputting to a cropping ratio value through a graphical interface.

6. A system for non-linearly stretching a cropped image, comprising
a panoramic lens used to shoot a circular wide-angle image;
a display screen providing input settings for cropping the circular wide-angle image;
a memory used to store an field-of-view (FOV) difference table for the panoramic lens; and
a processor reading the FOV difference table in the memory, calculating a polynomial of an approximated curve drawn by the FOV difference table, and storing it in the memory,
wherein when a cropping instruction that indicates that only a portion of the circular wide-angle image within a specific viewing angle range is to be retained is input into an input interface, the processor performs the following process:
in the specific viewing angle range, resampling a plurality of points by the polynomial to obtain a plurality of corresponding spacing distances of the points;
stretching a remaining circular wide-angle image to an original size of the circular wide-angle image while maintaining a ratio of the spacing distances between the plurality of points; and
outputting the stretched circular wide-angle image to the display screen.

7. The system for non-linearly stretching a cropped image as claimed in claim 6, wherein the polynomial is obtained from the approximated curve of every n degree viewing angle versus its corresponding spacing distances, where $1 \leq n \leq 10$.

8. The system for non-linearly stretching a cropped image as claimed in claim 6, wherein the plurality of points resampled from the polynomial and the corresponding spacing distances produce an optimized mesh, and the remaining circular wide-angle image is stretched while maintaining a distance ratio of each grid of the optimized mesh.

9. The system for non-linearly stretching a cropped image as claimed in claim 6, wherein the values are 1 to 90.

10. The system for non-linearly stretching a cropped image as claimed in claim 6, wherein the input interface is a touch sensor, and the cropping of the circular wide-angle image is implemented by setting a cropping ratio value through a touch action.

* * * * *